United States Patent [19]

Rees et al.

[11] 4,298,274

[45] Nov. 3, 1981

[54] VARIABLE DENSITY FILTER FOR A MULTI-MAGNIFICATION COPYING DEVICE

[76] Inventors: James D. Rees, 5880 Palmyra Rd., Pittsford, N.Y. 14530; Kenneth W. Altfather, Jr., 9 Timway Ct., Fairport, N.Y. 14450; William L. Lama, 753 Blue Creek Dr., Webster, N.Y. 14580; Donna U. Ozern, Shadow La., Amherst, N.H. 03031

[21] Appl. No.: 110,068

[22] Filed: Jan. 7, 1980

[51] Int. Cl.³ .............................................. G03B 27/72
[52] U.S. Cl. ...................................... 355/71; 350/314; 354/296
[58] Field of Search ............... 350/163, 164, 166, 266, 350/314; 354/270, 296; 355/35, 37, 55, 50, 57, 67, 70, 71, 46, 8, 63

[56] References Cited

U.S. PATENT DOCUMENTS

| 2,356,694 | 8/1944 | Potter et al. ...................... 350/314 X |
| 3,279,311 | 10/1966 | Lichtner .......................... 354/296 X |
| 3,292,487 | 12/1966 | Jakobson ................................ 355/63 |
| 3,397,023 | 8/1968 | Land ................................... 350/160 |
| 3,614,222 | 10/1971 | Post et al. ............................... 355/8 |
| 3,669,538 | 6/1972 | Fowler ................................... 355/67 |
| 3,777,135 | 12/1973 | Rees ................................. 355/70 X |
| 3,981,565 | 9/1976 | Karasawa ........................... 350/266 |
| 4,229,097 | 10/1980 | Vulmiere et al. ................. 355/71 X |

OTHER PUBLICATIONS

IBM Technical Disclosure Bulletin, "Illumination Compensation for Cos$^{4\theta}$ Lens Attenuation," G. W. Hobgood, Jr., vol. 14, No. 11, Apr. 1972, p. 3324.

Lenses in Photography, The Practical Guide to Optics for Photographers, CH. VIII, "Lens Attachments", Kingslake, published for Garden City Books, Garden City, N.Y., 1951, p. 143.

*Primary Examiner*—Richard A. Wintercorn

[57] ABSTRACT

In an optical system for a multi-magnification copying device, a relative illumination filter is mounted in a fixed position relative to the projection lens with the center on the lens optical axis. The filter provides a radially varying transmission therethrough which compensates for circularly symmetric nonuniformities in the optical system at any magnification.

5 Claims, 5 Drawing Figures

VARIABLE DENSITY FILTER FOR A MULTI-MAGNIFICATION COPYING DEVICE

BACKGROUND OF THE INVENTION

This invention relates generally to a full frame copying device and, more particularly to an improved optical system adapted to provide a uniform irradiance at an image plane through a multi-magnification range.

In electrophotographic copiers, the areas of a charged photoconductive surface, which are irradiated by a light image, are dicharged, the degree of discharge dependent upon the intensity (irradiance) of the impinging light rays. It is, therefore, desirable that the light ray intensity vary only due to the reflectance characteristics of the original document being copied rather than due to changes introduced by the imaging components. Stated in another manner, the optimum system would be providing uniform photoconductor irradiance given a uniformly reflecting document.

Of the factors affecting relative irradiance at an imaging plane, the most significant is the cosine (cos) variation wherein the irradiance at an image plane is proportional to the $\cos^4$ of the angle between the lens axis and the field beam. Thus, even if an object plane is uniformly illuminated, photoconductor irradiance decreases as radial distance from the system optical axis increases. Various approaches have been devised to compensate for this effect. Typically, in slit-scanning systems, a sheet of opaque material having a butterfly slit formed thereon is employed with the irradiance profile. Other slit-scanning systems utilize a variable density filter in the optical path whose transmissiveness varies inversely to the $\cos^4$. Such a device is described in IBM Technical Disclosure, Vol. 14, No. 11 (April 1972). In addition to the $\cos^4$ variation, other circularly symmetrical non-uniformities such as lens exit pupil distortion, lens transmission and vignetting affect the relative irradiance at the imaging plane.

In full frame imaging systems wherein an entire document is typically illuminated by flash illumination, efforts to compensate for $\cos^4$ light falloff have emphasized locating light sources in such a way that the document edges are illuminated to a greater degree than central areas. Two such systems are disclosed in U.S. Pat. Nos. 3,669,538 (Fowler) and 3,777,135 (Rees). If these systems provide a magnification (generally reduction) option, a variation of the field angles (hence, $\cos^4$ variation) occurs with magnification changes, and it has not been possible to maintain the desired image plane illumination through all the reduction positions. This problem is further accentuated in system in which the document to be copies is edge or corner-registered due to the assymetrical aspect of the field.

SUMMARY OF THE INVENTION

It is therefore, the principal object of the present invention to provide uniform imaging of a document in a full frame, multi-magnification copying system by compensating for the effects of $\cos^4$ and other variations through all magnification positions assumed by the projection lens.

This object is accomplished by positioning a variable density filter at suitable distance from the projection lens, the filter having aradially varying, circularly symmetric density which attenuates light passing therethrough so as to provide an irradiance profile at the imaging plane which is compenstated for the lens $\cos^4$ falloff, lens pupil distortion, lens transmission and vignetting. This filter will hereinafter be designated as a relative illumination filter. The filter center is fixed in position on the lens optical axis and maintains this position relative to the lens in any magnification location assumed by the lens. According to one aspect of the invention, by maintaining the same relative lens-to-filter spacing, uniform irradiance at the image plane is maintained throughout the reduction range.

DESCRIPTION

Figure 1:
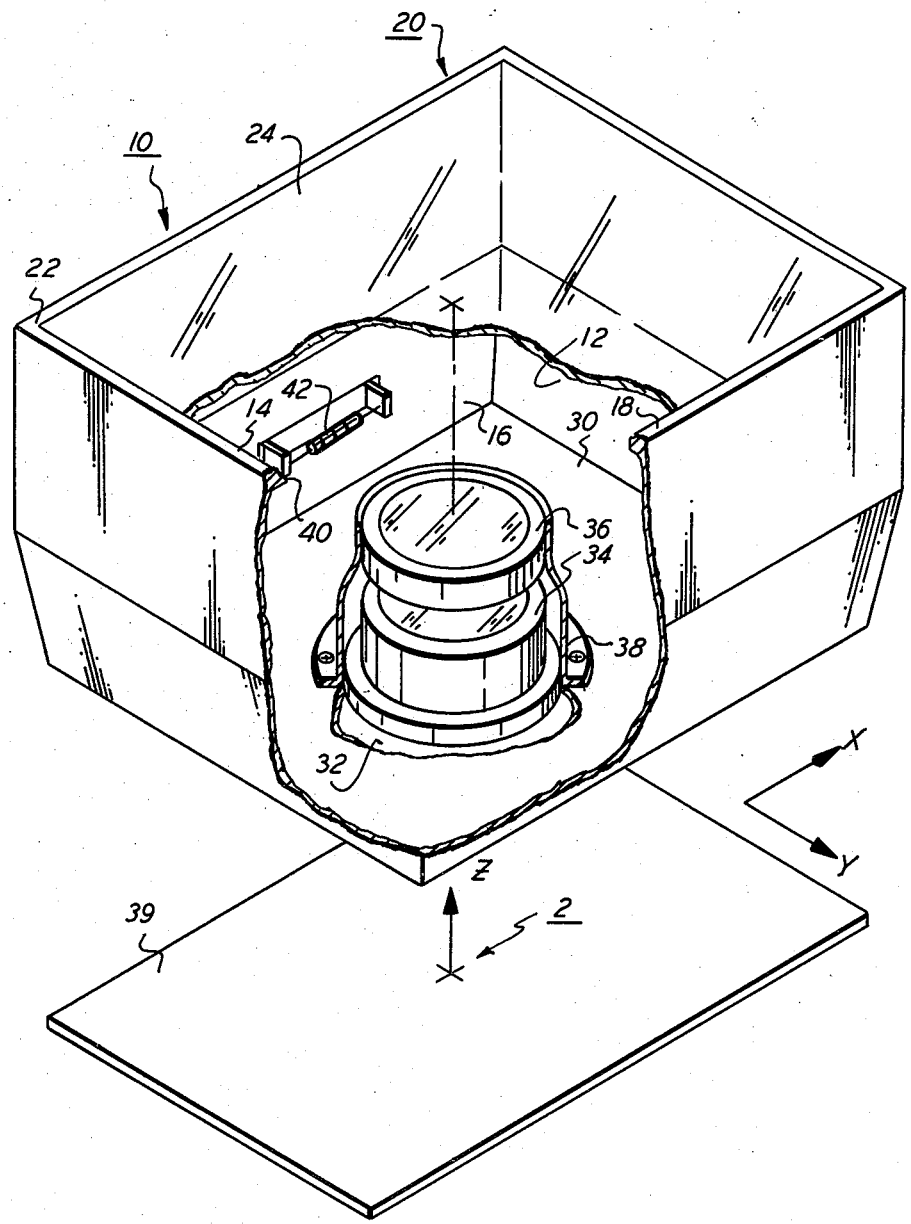
FIG. 1 is a view of an optical system for a full frame copier with the relative illumination filter of the present invention located in the optical path.

Referring now to FIG. 1, there is shown a full frame exposure optical system which utilizes a relative illumination (RI) filter constructed and positioned according to the principles of the present invention. The optical system may be of the type described in copending U.S. application, Ser. No. 015,558, filed on Feb. 26, 1979 whose contents are hereby incorporated by reference.

Generally, a completely enclosed housing 10, has a first pair of opposing side walls 12, 14 and a second pair of opposing side walls 16, 18. An upper, or top wall 20 includes a rectangular aperture 22 which, at the center thereof, accommodates a glass platen 24 forming the object plane.

The lower, or bottom wall 30 has an aperture 32 therein which accommodates lens 34.

Relative illumination (RI) filter 36 is fixedly mounted above lens 34 by a mounting bracket 38 with the center of the filter on lens optical axis Z and the XY plane of the filter perpendicular to the axis. Filter 36 is a variable density filter having a transmission profile that increases with radial displacement from the optical axis as described in greater detail below.

An image plane 39 which may, for example, be a photoconductive sheet to which a charge has been applied, is positioned for exposure to light reflected from a document (not shown) on platen 24, transmitted through filter 36 and projected by lens 34. The optimum spacing between the filter and lens depends upon actual system requirements and can be determined by design techniques known to those skilled in the art. If desired, the filter can be incorporated as part of the lens. The optical system also includes a flash illumination source 42 which may be a periodically pulsed xenon lamp. The interior of the housing 10 is preferentially coated with a substantially diffusely reflecting material. When lamp 42 is flashed, a substantially uniform illumination of the document placed on the platen is obtained. The light reflected by the document passes through filter 36 which attenuates the amount of light passing through in accordance with its transmission profile. The compensated light profile is projected through lens 34 and falls upon plane 39 selectively discharging the sheet and resulting in formation of a latent electrostatic image thereon. The lens filter combination is assumed to be at unity (1:1) magnification.

Figure 2:
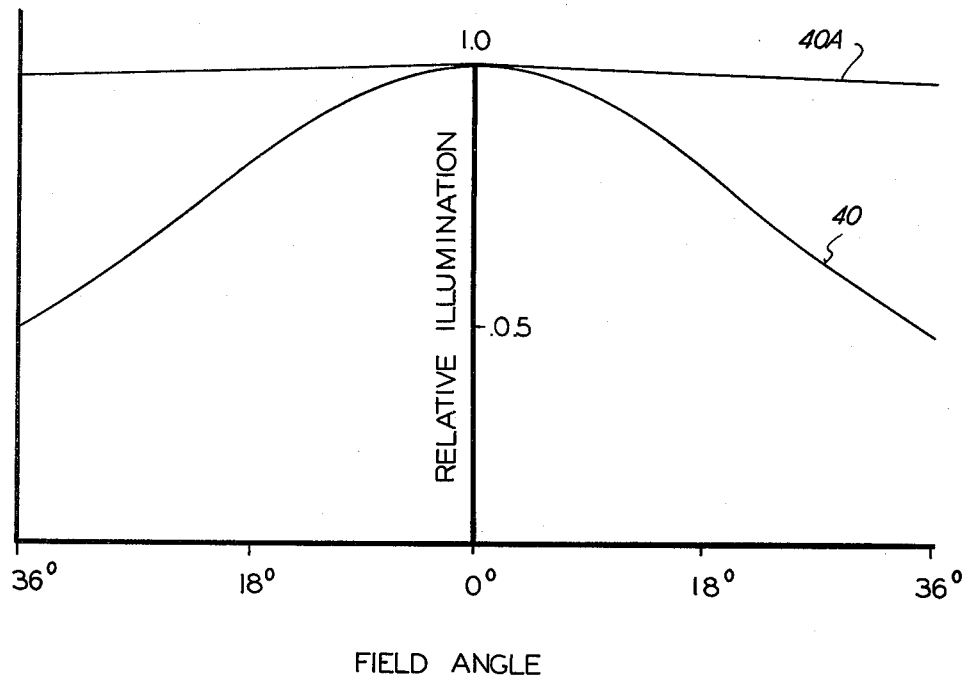
FIG. 2 is a graph which illustrates the relative illumination falloff at a photoconductive plane at wide field angles in both a corrected and uncorrected mode.
Figure 3:
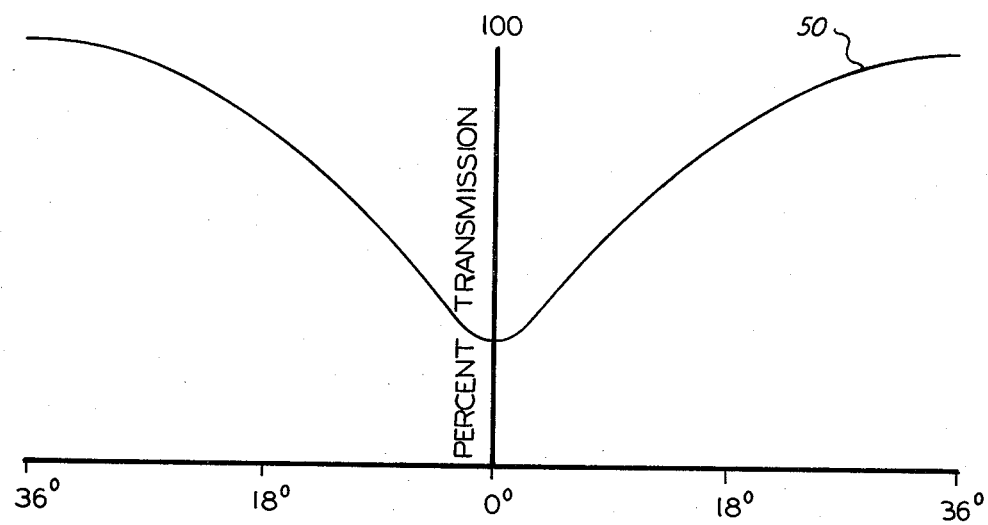
FIG. 3 is a graph illustrating the transmission profile of the filter of FIG. 1.
Figure 4:
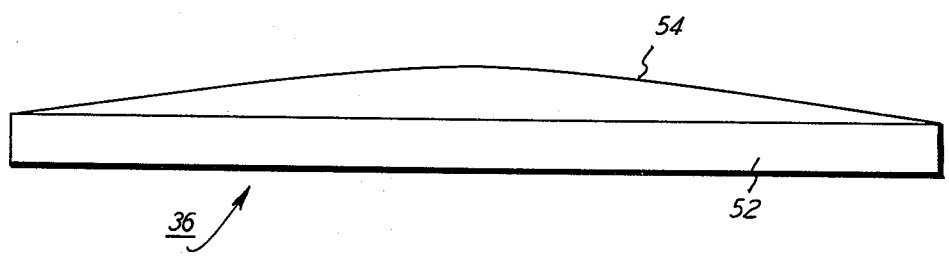
FIG. 4 is a cross-sectional view of the filter shown in FIG. 1.

In the absence of filter 36, the effects of $\cos^4$ and other variations at half field angles of up to 36° would result in a falloff of relative irradiance at the image plane as shown by plot 40 of FIG. 2. Plot 40A shows the improvement in image plane irradiance when designing filter 36 with a transmission profile 50 as shown in FIG. 3. Transmission profile 50 is seen to be radially symmetric increasing with distance from the center. Profile 50 is obtained by forming filter 36 as shown in FIG. 4. Filter 36 comprises a circular glass plate 52 having a thin layer 54 of a vacuum deposited metal, typically chrome or nichrome. The density of layer 54 is maximum at the filter center and decreases outward to the edges of the plate. Typically density layer thickness at the center are in hundreds of microns. Thus, the transmission of the filter, which depends inversely on the density of layer 54, increases with distance from the filter center (optical axis). Plot 40A in FIG. 2 shows the relative illumination compensation when using the filter of the present invention.

Figure 5:
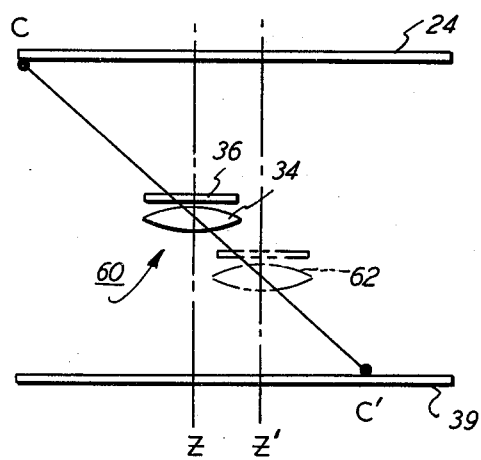
FIG. 5 is a schematic view of one embodiment of the lens and filter of FIG. 1 at unity magnification and reduction positions.

FIG. 5 is a schematic view of lens 34 and filter 36 in a unity magnification and reduction position. It is assumed that the system shown in FIG. 1 requires continuously variable optical magnification over a given range while maintaining a constant total optical conjugate. The system is also one in which documents are corner registered. Lens 34 is a zoom lens whose focal length can be continuously varied. As shown in FIG. 5, at position 60, the lens/filter assembly are at unity magnification with the center of each element lying on optical axis z. When operating in a reduction mode, the assembly (by means not shown) is moved to position 62 to adjust the object and image conjugates with the focal length of lens 34 undergoing simultaneous changes to retain proper focusing. The center of the lens/filter assembly now lies on optical axis Z'. It is seen that the filter remains symmetrical with the changing lens optical axis during lens translation and therefore provides continuous and uniform compensation at all magnification positions while maintaining corner registration (C-C').

The above principles will be valid for situations requiring enlargement as well. For example, if a document is to be magnified at a 1.5×ratio lens 34/filter 36 would be translated away from the photoreceptor to a new position (not shown) and the focal length adjusted accordingly.

Although the filter of the invention has been shown in connection with the specific embodiment of FIG. 1, it may be practised in other environments. For example, alternate optical systems may change magnification by varying total conjugate: e.g. moving object and/or image planes, addition of folding mirrors. Edge, rather than corner registration, may be employed. While relatively uniform illumination of the object plane has been described, filter 34 could be designed to compensate for a non-uniform platen illumination provided the non-uniformity is circularly symmetric about the lens axis at all magnifications used. Although the filter has been shown mounted on the object side of the lens, it could also be mounted on the image side. Finally, although the description has described the use of the filter in relatively wide field angle situations where the illumination falloff problems are most severe, the filter is also suitable for use in systems having smaller field angle requirements.

What is claimed is:

1. A full frame, flash exposure optical system for a copier having magnification capabilities, including:
   an object plane for supporting a document to be reproduced onto an imaging plane;
   an illumination source for illuminating said object plane;
   a lens for projecting an image of said object onto an imaging plane;
   means for compensating for circularly symmetric exposure variation at said image plane said means comprising a variable transmission filter mounted in a fixed relation to said lens and having its center on the lens optical axis, said filter having an area of varying density which provides, for light passing therethrough, a radially symmetrical light transmission profile which is minimum at the center and which increases with distance from the center;
   means for changing the magnification of said optical system said means at least effecting a translation of said lens and filter to maintain document registration;
   wherein said filter maintains its position on the lens optical axis at any magnification position and compensates for said exposure variations throughout the magnification range.

2. The optical system of claim 1 wherein said filter is mounted on the object side of said lens.

3. The optical system of claim 1 wherein said filter is mounted on the image side of said lens.

4. The optical system of claim 1 wherein said illumination source provides relatively uniform illumination of said object plane.

5. The optical system of claim 1 wherein said illumination source provides non-uniform illumination of said object plane.

* * * * *

UNITED STATES PATENT AND TRADEMARK OFFICE
CERTIFICATE OF CORRECTION

PATENT NO. : 4,298,274
DATED : November 3, 1981
INVENTOR(S) : James D. Rees, et al.

It is certified that error appears in the above-identified patent and that said Letters Patent are hereby corrected as shown below:

On Title page, after listing of inventors, add --Assignee: Xerox Corporation, Stamford, Conn.--.

Col. 1, line 12, change "dicharge" to --discharge--; line 52, change "system" to --systems--; line 53, change "copies" to --copied--; line 65, change "aradially" to --a radially--.

Col. 3, line 18, change "thickness" to --thicknesses--.

Signed and Sealed this

Second Day of February 1982

[SEAL]

Attest:

*Attesting Officer*

GERALD J. MOSSINGHOFF
*Commissioner of Patents and Trademarks*